Patented Feb. 14, 1950

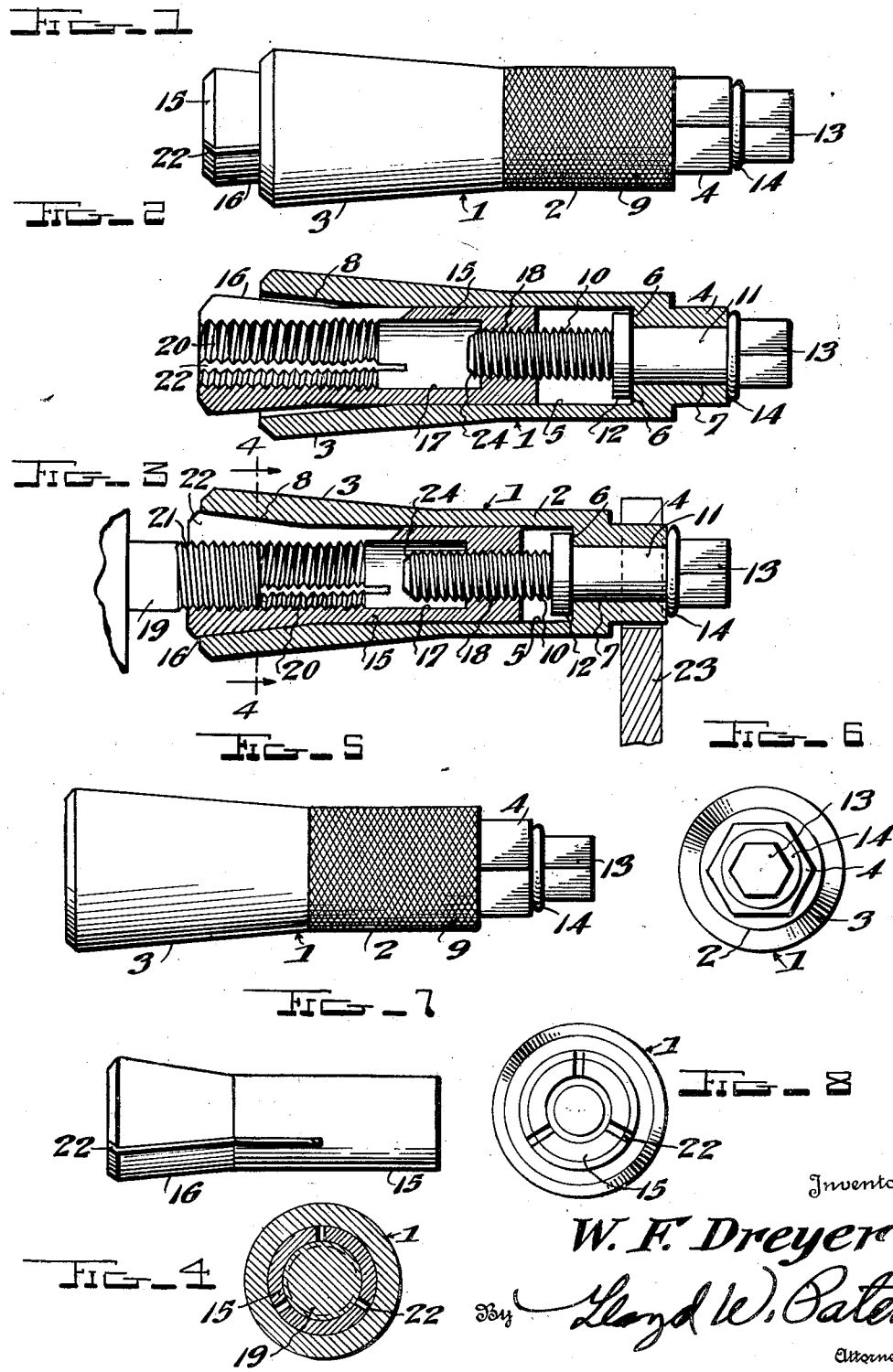

2,497,214

UNITED STATES PATENT OFFICE 2,497,214

STUD EXTRACTOR TOOL

William F. Dreyer, Miami, Fla.

Application March 18, 1946, Serial No. 655,271

2 Claims. (Cl. 81—53)

This invention relates to stud extractors, and particularly to a tool of this character intended and adapted to be employed in gripping and holding stud bolts, stay bolts, and other screw threaded fasteners that are headless, so that such bolts or screw threaded members can be tightened into place and can be extracted.

An object of my invention is to provide a tool which is adaptable to be used with and upon screw threaded stud and bolt ends and the like of different sizes, or with different standards and pitches of threads.

Another object is to so construct the tool that a plurality of collet or clamping pieces, for different sizes of studs and for different pitches and standards of threads can be readily interchangeably fitted and employed.

Still another object is to provide a single tightening and manipulating screw which can be readily operated to tighten the collet or clamping piece upon a screw threaded stud or bolt end, and to loosen the same therefrom, and which at the same time can be manipulated to remove a collet or clamping piece and to adjust another clamping piece into place when it is desired to change to different sizes or diameters, or to substitute a collet or clamping piece having a different pitch or standard of thread.

With the above and other objects in view, some of which will be apparent to those skilled in the art, and others of which are inherent in the use and operation of my improved tool, this invention includes certain novel features of construction and combinations and arrangements of parts which will be hereafter set forth in connection with the drawing, and then pointed out in the claims.

In the drawing:

Figure 1 is a view in side elevation illustrating an embodiment of my invention.

Fig. 2 is a longitudinal sectional view of the showing in Figure 1.

Fig. 3 is a view similar to Fig. 2 illustrating the tool clamped upon the threaded end of a stud or bolt.

Fig. 4 is a transverse sectional view substantially on line 4—4 of Fig. 3.

Fig. 5 is a view in side elevation of the casing and tightening screw.

Fig. 6 is a view in end elevation of the tool.

Fig. 7 is a view in side elevation showing one of the collet or clamping pieces.

Fig. 8 is a view in end elevation of the showing in Fig. 5.

In the adaptation as shown in the several figures of the drawing, the outer sleeve or casing 1 is provided with an externally cylindrically middle portion 2 and is gradually flared out and enlarged toward one end, as at 3, the casing being provided with a hexagonal or other polygonal or tool receiving portion 4 at its other end. This outer sleeve or casing or body member 1 has an axial bore 5 extending thereinto from the enlarged end, and terminating in a shoulder 6, and an axial bore 7, of lesser diameter, extends from the shoulder 6 through the end of the polygonal portion 4. At the open end of the bore 5, a taper is provided, as at 8, thus giving a flared out tapered throat or seat portion. This outer sleeve or casing or body can be readily and cheaply made out of tool steel or other desired metal, by lathe and other ordinary shop or factory operations, and in order that the tool may be more readily grasped and held and manipulated, it is perhaps desirable that the cylindrical portion 2 be provided with knurling, as at 9.

A tightening and adjusting screw 10 has a cylindrical bearing portion 11 received through the opening 7 for free rotational movement, and a flange 12 is provided on this adjusting end tightening screw 10 in position to bear against the shoulder 6 so that the threaded end of the tightening screw 10 is disposed to extend substantially centrally or axially within the bore 5 of the outer sleeve or casing or body. After placement of the screw 10 with the bearing portion 11 thereof extending through the bearing opening 7, a polygonal head 13 is secured on the outer end. This head 13 is rigidly mounted in any desired and well known manner, and is made of hexagonal or other polygonal or distinctive shape that will permit application of a wrench or other tool for rotating the screw 10; and, it may be further desirable to provide a shoulder ring 14 at the inner extremity of the head 13 so that a free rotating thrust bearing is provided on the outer face of the portion 4 of the casing, and at the same time a wrench or tool applied to the head 13 will be held from contact with any portion of the outer sleeve or casing.

A collet or clamping piece 15 has a cylindrical body portion of shape and size to fit and slide freely within the bore 5, and at one end this member 15 has an enlarged tapered portion 16 corresponding in its angle of inclination substantially with the angle of the enlarged tapered bore of the outer sleeve or casing at 8. The collet or clamping piece 15 has an axial bore 17 extending thereinto from the enlarged end, and is provided with an internally screw threaded opening 18 at its other end to receive and fit the screw threaded end of the tightening bolt 10. The bore 17 is of an internal diameter corresponding with the diameter of the stud or bolt 19, and is provided with internal screw threads 20 to fit the screw threads 21 of the stud or bolt end 19, without too snug fitting. The collet or clamping piece has a plurality of equi-distantly spaced cuts or splits 22 extending substantially radially through the wall thereof from the outer end of the tapered portion 16, and these slots or splits 22 thus provide contractible resiliency for the tapered portion 16 and the portions of the collet or clamping piece having the threads 20 therein.

The collets or clamping pieces 15 can be made up or supplied to fit and be used upon threaded stud or bolt ends of different diameters, and of different shapes, and with threads of different pitches and different standards; and, these parts are each made to be interchangeably fitted and used with the outer sleeve or case 1 and the tightening screw 10, as these parts are assembled.

Assuming a collet or clamping piece to be fitted in place as shown in Figs. 1 and 2, the tightening screw 10 is rotated sufficiently to draw or move the collet or clamping piece into a retracted position where the tapered portion 16 thereof bears upon and against the tapered wall 8 of the outer sleeve or casing to hold the collet frictionally against rotational movement, but without contracting the split portion thereof. Since the thread 20 is cut or formed for a more or less loose fit on the threaded end 21 of the stud or bolt 19, the tool can then be grasped by the knurled portion 9 and can be rotated to turn the threaded portion 20 on to the threads 21. By then applying a wrench or tool to the head 13, the tightening screw 10 can be manipulated to draw the shoulder 16 of the collet 15 clampingly against the tapered throat or shoulder 8 of the outer sleeve or casing, thereby contracting the split portion of the collet or clamping piece so that the threads thereof lock upon the threaded end 21. When the tool is thus locked in place, a wrench or other tool 23 can be applied to the portion 4 of the casing, after the manner illustrated in Fig. 3, and the tool can then be rotated to tighten the stud 19 into place or to extract the same, or to otherwise manipulate and rotate and handle the stud or bolt having the tool clamped upon the threaded end thereof.

When it is desired to use a collet or clamping piece having a different diameter of opening or a different pitch or standard of thread or a different shape, the tightening screw 10 is rotated to force the collet or clamping piece 15 out of the bore 5 of the outer sleeve or casing, and as the threaded portion of screw 10 leaves the threaded opening 18, the collet can be freely removed, and a new or different, or the same collet, can be readily replaced. While the parts are accurately sized, it may be found desirable to reduce the end of the tightening screw 10, as at 24, to thus insure easy entry of this threaded end into the threaded opening 18 of each and every collet or clamping piece as fitted into place.

Only the manipulation of the parts to accomplish tightening of the collet upon the threaded portion 21 has been described, but it will be apparent that when the tightening screw 10 is turned to move the body of the collet 15 outwardly within the bore 5, the contracting contact of the tapered outer wall 16 of the collet with the flared throat 8 of the outer sleeve or case will be released so that the split portion of the collet will expand to release the grip on the threaded end 21 and thus permit the tool to be turned off and disengaged from this threaded end.

While I have herein shown and described specific embodiments of my invention and have suggested only possible modifications, it will be appreciated that many changes and variations can be made in the form and arrangements and assembly of the parts to suit different conditions and purposes of use, without departing from the spirit and scope of my invention.

I claim:

1. A stud extracting tool comprising an outer sleeve having an axial cylindrical bore extending thereinto from one end and enlarged to provide an outwardly flared smooth surfaced conical opening at said end, said outer sleeve having a bearing opening extending axially through its opposite end, a tightening screw swiveled within the bearing opening against endwise movement with its threaded end extending into the bore and with a manipulating portion extending beyond the end of the outer sleeve, and a substantially cylindrical smooth surfaced collet slidably and rotatably insertable within the bore of the outer sleeve provided with a threaded opening to receive the threaded end of the tightening bolt and having an internal bore threaded to receive the threaded end of a stud, said collet having a smooth surfaced outwardly flared external portion and being longitudinally split at the internally threaded flared end, and said collet being freely rotatable as initially inserted within the bore and being locked against rotation solely by binding of its tapered outer wall against the tapered inner wall of the sleeve as the collet is drawn thereinto by the tightening screw.

2. A stud extracting tool comprising an outer sleeve having a middle substantially cylindrical portion with a polygonal portion at one end and an outwardly flared long conical portion at the other end, said outer sleeve having a central cylindrical bore entering from the flared end and provided with a flared long conical enlargement at the opening end, said outer sleeve also having a bearing opening extending axially through the polygonal manipulating portion, a tightening screw swiveled in said bearing opening against endwise movement with its threaded end extending into the bore, a polygonal manipulating end on said tightening bolt extending outwardly beyond the manipulating portion of the outer sleeve, and a collet of generally cylindrical form slidably and rotatably insertable within the bore of the outer sleeve having its outer end enlarged and flared conically outwardly, said collet having the flared end internally screw threaded to receive a threaded end of a stud and split longitudinally and the collet being provided at its opposite end with an internally screw threaded opening receiving the threaded end of the swiveled tightened screw, and the collet being initially rotatable within the bore of the outer sleeve and being locked against rotation solely by binding contact between the tapered surfaces as the tightening screw draws the collet into the outer sleeve.

WILLIAM F. DREYER.

REFERENCES CITED

The following references are of record in the file of this patent:

UNITED STATES PATENTS

| Number | Name | Date |
|---|---|---|
| 1,615,201 | Stowe et al. | Jan. 18, 1927 |

FOREIGN PATENTS

| Number | Country | Date |
|---|---|---|
| 284,459 | Germany | June 1, 1915 |